(12) United States Patent
Riceman

(10) Patent No.: US 6,760,779 B1
(45) Date of Patent: Jul. 6, 2004

(54) APPARATUS AND METHOD FOR HIGH SPEED DATA COMMUNICATION

(76) Inventor: William K. Riceman, 402 Sunrise Cir., Fair Play, SC (US) 29643

(*) Notice: Subject to any disclaimer, the term of this patent is extended or adjusted under 35 U.S.C. 154(b) by 0 days.

(21) Appl. No.: 09/239,944

(22) Filed: Jan. 29, 1999

Related U.S. Application Data

(63) Continuation-in-part of application No. 08/889,776, filed on Jul. 8, 1997.
(60) Provisional application No. 60/021,345, filed on Jul. 8, 1996.
(51) Int. Cl.[7] .............................................. G06F 15/16
(52) U.S. Cl. ....................... 709/247; 709/246; 709/250
(58) Field of Search ................................ 709/227, 236, 709/238, 245, 247, 246, 250

(56) References Cited

U.S. PATENT DOCUMENTS

| | | | | |
|---|---|---|---|---|
| 5,016,275 A | * | 5/1991 | Smith | 380/260 |
| 5,052,040 A | * | 9/1991 | Preston et al. | 340/5.74 |
| 5,058,164 A | * | 10/1991 | Elmer et al. | 380/277 |

* cited by examiner

*Primary Examiner*—Thomas R. Peeso
(74) *Attorney, Agent, or Firm*—Jean-Marc Zimmerman

(57) ABSTRACT

An apparatus and method for high speed transmission of data over a transmission line/medium/network telephone, wherein this high speed is achieved by simultaneously, or in a timed and marked relationship, transmitting multiple bits of data over parallel frequencies rather than serially transmitting one bit of data at a time over one frequency.

31 Claims, 5 Drawing Sheets

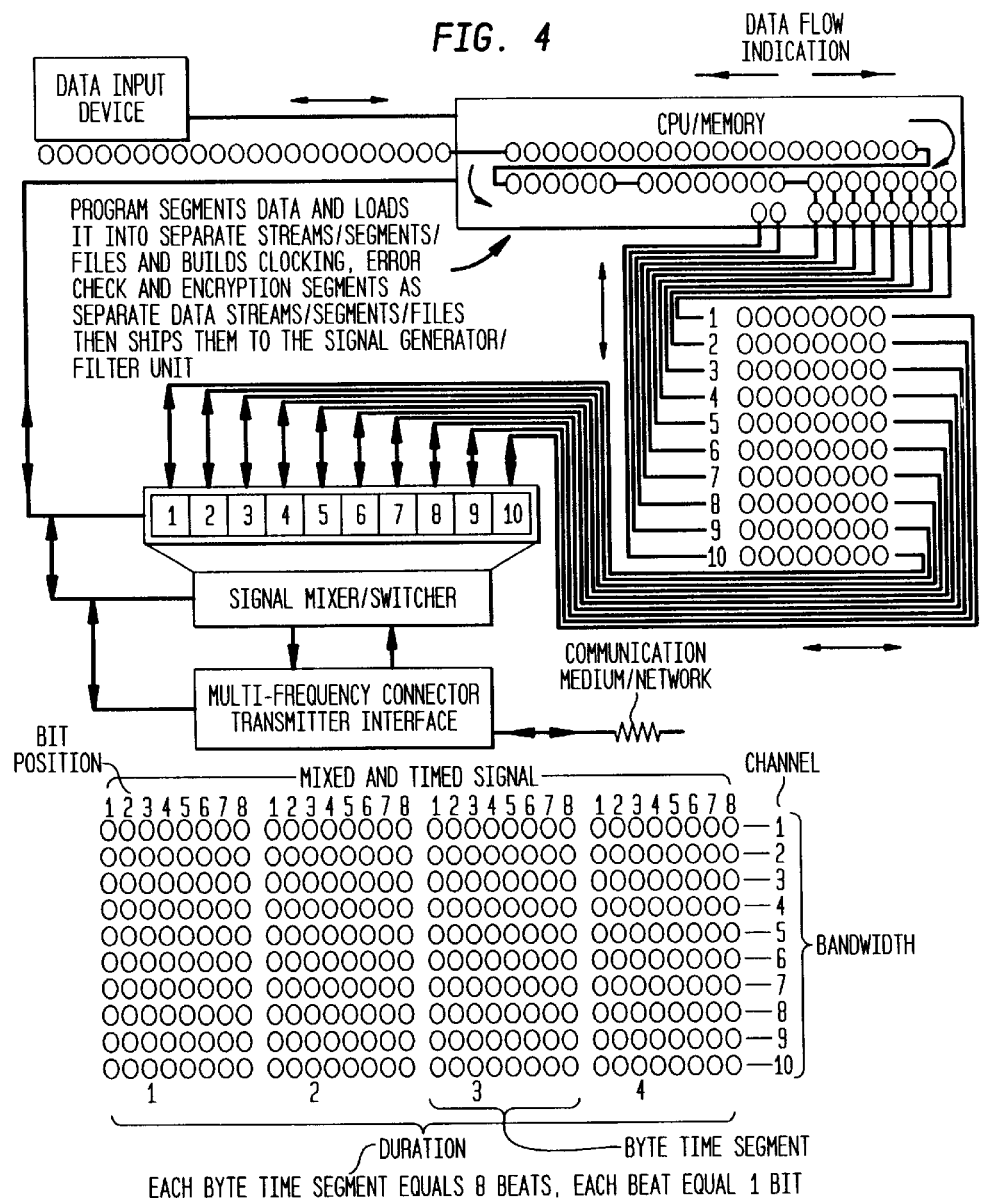

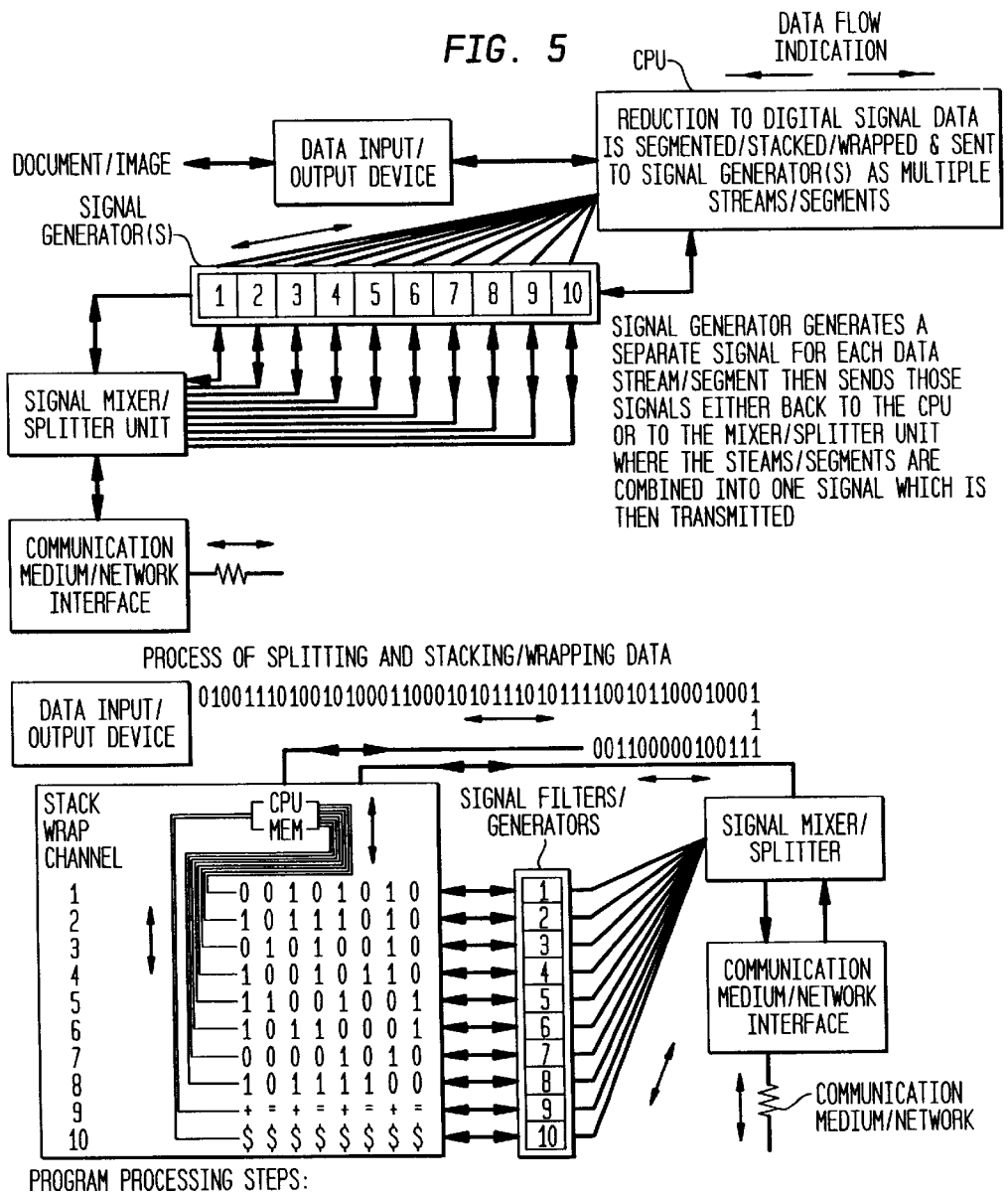

APPARATUS AND METHOD FOR HIGH SPEED DATA COMMUNICATION

This application is a continuation-in-part of U.S. patent application Ser. No. 08/889,776, entitled Apparatus and Method For High Speed Data Communication, filed on Jul. 8, 1997 by Riceman, which claims the benifit of the filling date of Provisional Patent Application Serial No. 60/021,345 filed on Jul. 8, 1996.

FIELD OF THE INVENTION

This invention relates to devices for transmitting data over a communication line/medium/network, and more particularly to an apparatus and a process for transmitting data in parallel over a communication line/medium/network.

BACKGROUND OF THE INVENTION

Devices for transmitting data over communications lines such as modems are well known in the prior art. These devices are commonly used throughout the world to enable businesses, governments and educational institutions to conduct their affairs. They are also being used more commonly in homes throughout the world for personal computing and communication. The use of these devices continues to increase as ever larger numbers of people are communicating on the information super highway.

Although improvements in modem technology enable the speed at which these devices operate to be periodically increased, the process they employ to transmit data serves as an inherent limitation on the top speed they will ever be able to attain. This is because conventional modems transmit data in serial, i.e. one bit of data at a time, over one frequency. It is, therefore, an object of this invention to provide an apparatus and a process which overcomes this limitation by simultaneously transmitting multiple bits of data over parallel frequencies within the narrowest possible bandwidth while providing a higher level of security.

SUMMARY OF INVENTION

An apparatus and method for high speed transmission of data over a communication line/medium/network, wherein this high speed is achieved by generating multiple signals which are alternately combinable and seperable to enable multiple bits of data to be transmitted simultaneously and or in a timed relationship over parallel frequencies rather than being transmitted one bit at a time over one frequency.

BRIEF DESCRIPTION OF THE DRAWINGS

Referring to FIGS. 4 and 5 there are shown two drawings depicting two additional examples of how the invention which is the subject of this application operates on bits of data in the handling of yet another form of data configuration, such as but not limited to, the real time processing, transmission and reception of voice and/or video files.

DETAILED DESCRIPTION OF THE INVENTION

Figure 1:
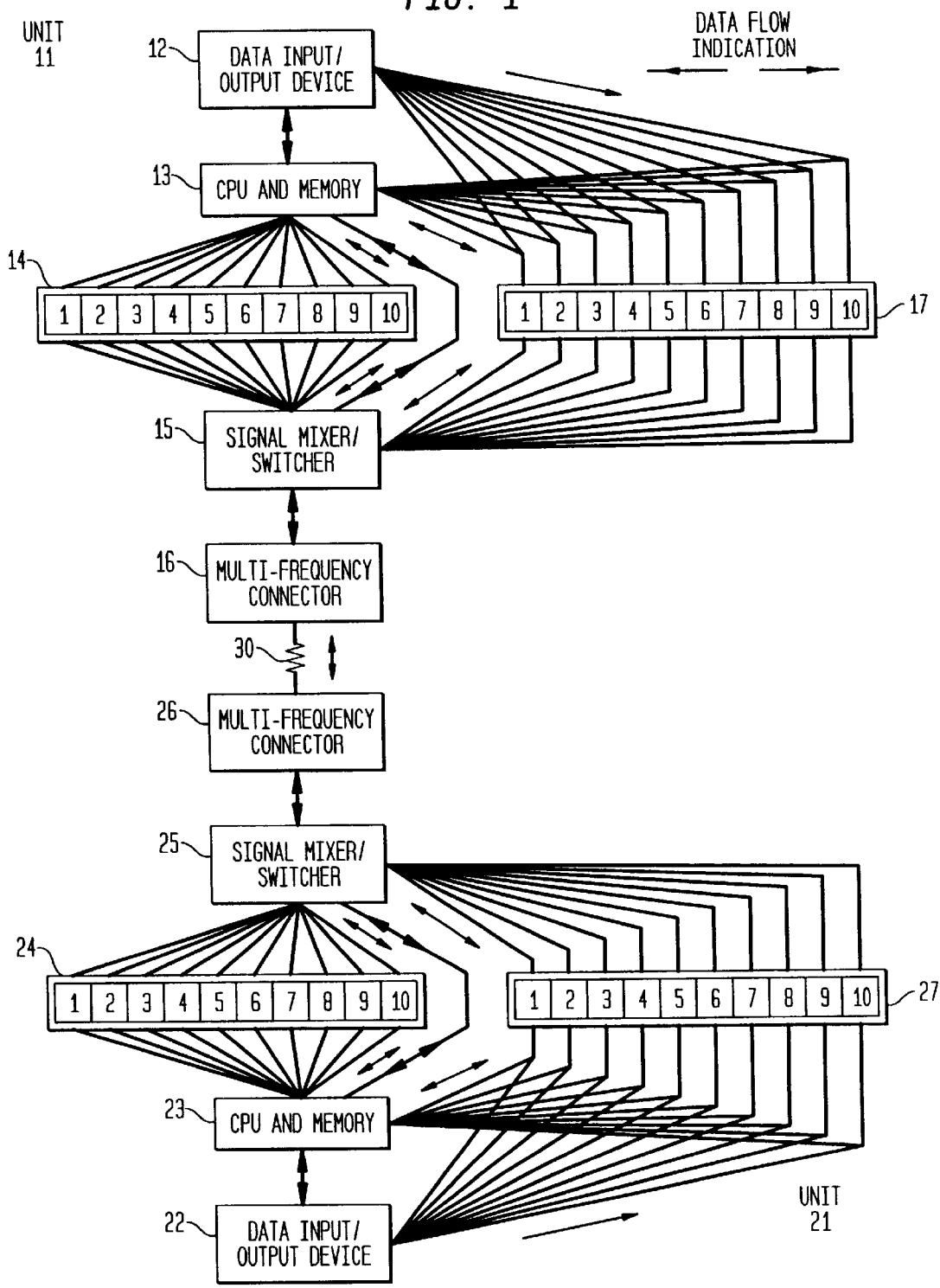
Referring to FIGS. 1 and 2 there are shown two exemplary embodiments of the apparatus which is the object of this invention.

Referring to FIG. 1, there is shown a system for high speed parallel transmission of data over a communication line/medium/network according to the present invention 10. This system is comprised of two basically identical transmitter/receivers 11 and 21. Transmitter-receiver 11 is comprised of one or more data input/output device(s) 12, CPU and/or memory 13, outgoing signal generator(s) 14, mixer/switcher 15 multi-frequency connector 16 and incoming signal discriminators/filters 17. Transmitter-receiver 21 is comprised of one or more data input/output device(s) 22, CPU and/or memory 23, outgoing signal generator(s) 24, mixer/switcher 25, multi-frequency connector 26, incoming signal discriminator/filters 27. Device 11 is coupled to device 21 over a communication line/medium/network, such as but not limited to, a standard copper telephone line 30. The system disclosed herein can be used to transmit data via computer, facsimile machine, video telephones or any similar device.

There is a limit to the amount of data which can be transmitted over conventional communications systems using existing technology. The fastest conventional modems are only able to transmit 56.6 thousand bits of data per second and this only if the communication line is a short wire, digital, cable or fiber optic cable or is a radio wave broadcast and then only if the access provider can support such a signal. In addition, throughout most of the world, only 28.8 or even 14.4 thousand bits of data, and in some cases even less, can be transmitted per second over the existing copper telephone lines which are all that is typically available.

Even the newest asymmetric systems require the installation of a network card within both the sending and receiving units, a special modem and the payment of a monthly access fee to one or more special communication line provider.

The present invention allows much greater amounts of data to be transmitted by splitting the signal to be transmitted over an existing telephone line or other communication medium/network into multiple signals which, when combined, form a multi-layered t one/signal which can later be filtered/separated and processed, thereby allowing multiple bits of data to be transmitted either simultaneously, or in a timed relationship, over parallel frequencies within, wherever advantageous, the narrowest possible bandwidth configuration.

Further, the present invention performs this function without all of the aforementioned expensive state of the art hardware and needless expense of a monthly special access fees.

By eliminating the aforementioned special communication access gate, and thus the gate keepers monthly fee and equiptment cost, the present invention will greatly enhance the accessibility of information in even the remotest areas of the poorest countries of the world.

One of the primary objectives of the present invention is to effectively address the desperate need for providing, to the largest number of people worldwide, rapid, inexpensive and dependable interactive access to existing and future information resources.

One of the primary reasons that the aforementioned remote and/or primitively equipped areas of the third world are presently developmentally hindered and/or politically volatile is due directly to their lack of rapid and adequate information access. The present invention is specifically designed to remedy this and other local and world wide information access problems.

One of the ways the present invention addresses the aforementioned problems is by the flexibility of its design and implementation methodology.

The present invention may be produced as a simple after market (plug and play) device which can be easily connected to and used with existing hardware such as, but not limited to, computers, televisions and fax machines. Alternatively, the present invention may be incorporated into these and other like devices during the manufacturing process.

Further, the present invention will provide for the aforementioned world wide enhanced and affordable rapid access to information now, when it is most needed. There will no longer be the necessity of waiting for the painfully slow and expansive installation of more modern communication lines and hardware such a fiber optic, cable or satellite networks.

The present system is designed to transmit data which can be generated or saved in a one or two bit/bite format or any derivative or multiple thereof. Transmission of the thus formatted data is based on whether a bit signal is present or absent, i.e., is defined/marked/modulated or in some way signified as either on or off.

Detection on the receiving end is based on either the presence or absence of said bit signal demarcated by said defined/marked/modulated specific tone/frequency, while all other tones/frequencies are filtered out and/or ignored or otherwise identified and disregarded. Once the thus received data is converted back into its original bit code format, the data may be viewed, shipped, further processed, printed, otherwise used or saved for later use.

Figure 2:
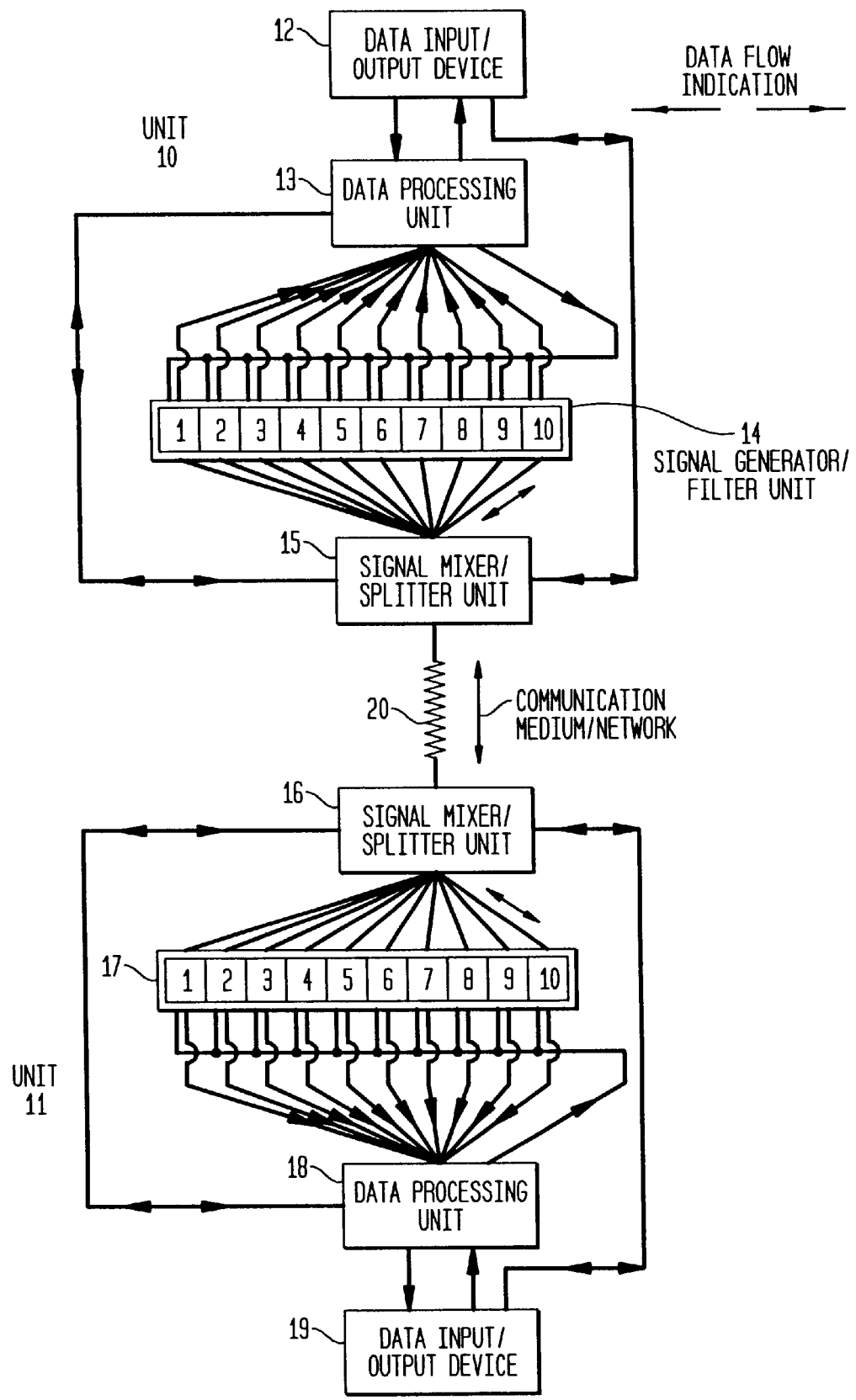

Referring to FIG. 2, there is shown one of the many possible configurations example of a system for high speed parallel transmission of data over a communication line/medium/network according to the present invention. This system is comprised of two basically identical transmitter/receiver units 10 and 11. Unit 10 is comprised of one or more data input-output device(s) 12, one or more data processing unit 13(s), signal generator(s)/filter(s) unit(s) 14 and signal mixer/splitter unit 15(s). Unit 11 is comprised of one or more data input-output device(s) 19, data processing unit 18, signal generator(s)/filter(s) unit 17 and signal mixer/splitter unit 16. Unit 10 is connected to unit 11 via a communication line/medium/network such as, but not limited to, a standard copper telephone line 20. The system herein can be used to transmit and/or receive data via a computer, television, telecommunications network, digital network, facsimile machine, video telephone or other similar device, system or networks either by utilization of direct (hard wired) and/or broadcast (wireless) systems.

Figure 3:
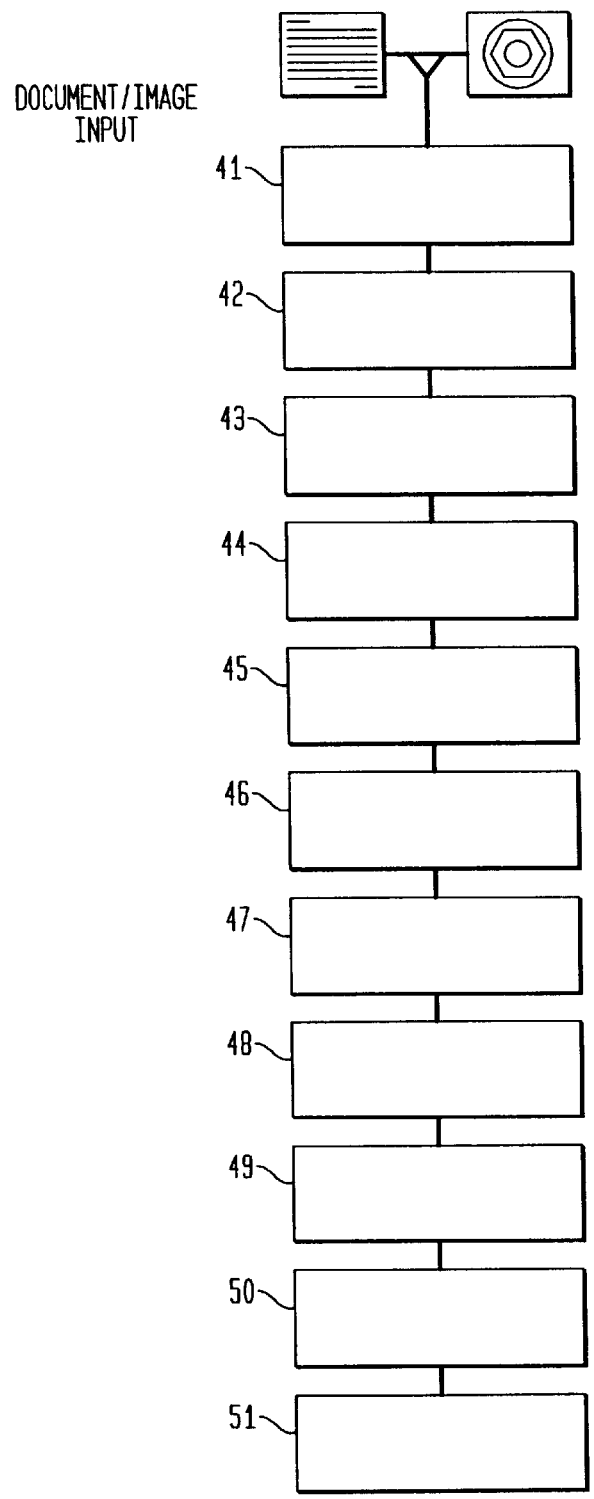
Referring to FIG. 3 there is shown a flow chart illustrating one example of the process which is the object of this invention as it relates to large files such as, but not limited to, stacks of document pages and/or picture files only.

Referring to FIG. 3, there is shown a flowchart detailing one process by which data may be transmitted according to the present invention as it relates to large files such as, but not limited to, multi-page document and/or image files. To transmit a document/image/data file 40, using this invention, the document/image/data file is first scanned/captured at 41 or created in a computer or other device and processed as a binary/digital signal in the CPU at 42. This data may or may not be compressed before, during or after being stacked/wrapped at step 43.

At step 44 this stacked/wrapped signal is then processed so that: the first eight bits processed are designated as a first data stream/segment, File 1; the next eight bits processed are designated as a second data stream/segment, File 2; and so on. Alternatively, the data can be processed so that: the first bit of the first byte is placed in a first data stream/segment, File 1; and the second bit of the first byte is placed in a second data stream/segment, File 2; and so on. At step 44 the stacked/wrapped signal is split into eight or more data stream(s)/segments containing an equal, or ue-equal but unknown, number of bits. Error check and/or clocking/encryption may then be created and added as additional data stream(s)/segment(s) and/or be appended to one or more of said eight or more data streams/segments. Any or all data streams/segments may then be further processed, stored or transmitted.

At step 42, 43, 44 and/or 45 each signal may have added to it a timed start/stop and/or sequence/encryption command to instruct the receiving processor how to read and reassemble the data. Alternatively, the timed start/stop and/or sequence/encryption command may be added to less than all of the data streams/segments. One example of the operation of steps 43, 44 and 45 on a single byte of data is shown in FIG. 3.

At step 46 the ten different data streams/segments are ideally sent to separate signal generators, which generators create multiple binary/digital signals separated from one another by a set frequency bandwidth. For, one non-limiting example, these multiple signals over which the data in question are to be transmitted could, using tones as an example only, begin at 500 Hertz, with each successive frequency being separated by 750 Hertz. This designation of frequencies can be implemented using existing telephone wiring and hardware and will allow for a minimum of 250 Hertz safe zone of separation with generated beat frequencies. Alternatively, the generated frequencies can be separated from one another by varying, predetermined frequency bandwidths. Moreover, instead of being sent to one signal generator capable of generating multiple signals of varying frequency for each data streams/segments. Alternatively, the aforesaid data streams/segments could be processed separately or sequentially by one or more multi-frequency signal generator(s). Although this sequential processing would be somewhat slower than multi-unit processing, due to the speed of modern processors, it would still allow a much higher transmission speed than can be attained by conventional modems.

At step 47 the signals from the one or more multiple frequency signal generators are combined by the signal mixer/switcher into one multi-frequency combined/layered signal which is in a timed and marked sequence. The mixer overlays/combines the multiple signal so that the individual signal sequence remain relatively intact in time, i.e. bits 1 through 10 are transmitted and received at the same relative time, i.e. they are transmitted in relative alignment and are received in that same relative alignment. Any synchronizational anomalies which may be introduced during processing, transmission or reception would be corrected at the receiving unit by referring to and making use of the aforementioned stop/start and/or timed sequence/encryption commands. Specifically, when the first bit of data stream/segment, file 1, is transmitted the first bit of data in each of streams/segments, file 2 through 10, are also simultaneously transmitted and/or are so marked as to be re-alienable by the receiving unit if transmitted other than simultaneously. Each data bit position of the 10 or more signals equals one beat in time or time beat as duration relates to signal transmission.

At step 48 the multi-layered/multi-frequency mixed signal is transmitted over a communication line/medium/network. At step 49 the signal is received. At step 50 the signal is filtered/split and then sent to the CPU. At step 51 the signal is reassembled. From there the signal can either be viewed, used or stored in memory, sent to a printer or other output device or processing device for further processing. It is understood that any or all of the aforementioned sequencing, filtering/splitting, marking, re-assembly and processing steps may be performed within one or more processing devices located within or in proximity to the sending and/or receiving units and that such a configuration is included within the scope of and therefore covered by the present invention.

Using the aforementioned tonal frequency designations as an example, the following frequencies could be used to transmit data according to the present invention: 500, 1250, 2000, 2700, 3500, 4250, 5000, 6750, 6500 and 7250 Hertz. Beat frequencies (subtractive) generated would be at 750, 1500, 2250, 3000, 3750, 4500, 5250, 6000 and 6750 Hertz. Beat frequencies (additive) generated would be at 1750, 2500, 3250, 4000, 4750, 5500, 6250 and 7000 Hertz. In the foregoing embodiment, additional harmonics would not be closer than 250 Hertz to any main data transmission frequency.

In addition, all frequencies/signals generated above 7500 Hertz would be filtered out or ignored as they would not be used. The foregoing frequencies are representative only and are in no way meant as a limitation.

It is, of course, understood that as filtering and processing technology improves, the separation needed between usable bandwidths which can be filtered or kept clearly separated will narrow so that less bandwidth distance between usable frequencies is required, thereby providing more frequencies on which to transmit data.

It is further understood that the foregoing example is not intended as a limitation but is for example only and that other electromagnetic and optical frequency designations and configurations may be used and would also fall within the scope of the present invention.

Further, by using selected data encoding/encryption commands I.E. data reconfiguration codes or keys, which would be resident within only the sending and receiving units, or sent along or separate from said data transmission, the present invention can be used to encrypt and decrypt the data being transmitted. One way in which this may be accomplished would be by setting the signal to a bit numbering scheme which is set or configured differently for each data stream/segment and/or transmission sequence being transmitted, even to the point of employing a floating encryption based upon a pre-determined algorithm.

The foregoing would permit data to be securely transmitted without fear that the person receiving the transmission is not the intended recipient as may happen when a wrong telephone number is dialed. Only the intended recipient would have the timed encryption key required to reassemble and make use of the data received. Without the key the received data would be a meaningless jumble of random data bits with no discernible pattern.

An illustrative example of how data could be transmitted employing one of the configurations of the present invention, in its tonal embodiment, over the aforementioned frequency designations is provided below. Transmission of the word "TEST" using straight corresponding bit-dash tone/frequency code would occur as follows:
Beginning Code (Handshake) Sent Prior to Actual Document
T=84=01010100=6500+5000+3500+a parity type check tone+timing.
E=69=01000101=6500+5750+7250+a parity type check tone+timing.
S=83=01010011=6500+5000+6500+a parity type check tone+timing.
T=84=01010100=6500+5000+3500+a parity type check tone+timing.
End of Transmission Sequence In the foregoing example, all four letters would be sent at the same time on four parallel frequencies and would be reassembled after reception based on the parity check and timing key sent along with the data.

FIGS. 3 and 4 show two drawings depicting two further examples of how the invention which is the subject of this application operates on bits of data.

It will be understood that the embodiments described herein are merely exemplary and that a person skilled in the art may make many variations and modifications to the described embodiments utilizing functionally equivalent elements and/or procedures to those described. Any variations or modifications to the invention just described are intended to be included within the scope of this invention as defined by the appended claims.

I claim:

1. A method for simultaneously transmitting multiple data files/streams/segments at multiple frequencies over a communication line/medium/network at high speed, comprising the steps of:

splitting said data into multiple data files/streams/segments;

generating and adding an error check and/or clocking/encryption signal to said multiple data files/streams/segments as a first and/or first and additional file(s)/stream(s)/segment(s);

sending each one of said multiple data files/streams/segments, said first and/or first and additional data files/streams/segments to one or more separate signal generator(s);

generating a different signal for each one of said multiple data files/streams/segments, said first and/or first and additional file(s)/stream(s)/segment(s), wherein the frequency of each one of said signals are separated from one another by a specified frequency bandwidth;

combining said multiple signals into one multi-frequency signal; and transmitting sa id multi-frequency signal over a communication line/medium/network.

2. A method for transmitting multiple digital data files/streams/segments in a timed relationship to one another utilizing multiple frequencies over a communications line/medium/network at high speed, comprising the steps of:

splitting said digital data into multiple digital data files/streams/segments;

generating at least one error check and/or clocking/encryption signal as a first and/or first and additional data file(s)/stream(s)/segment(s) to be transmitted simultaneously with or separately from said multiple digital data filed/streams/segments;

sending each one of said multiple digital data files/streams/segments, said first or said first and additional data file(s)/stream(s)/segment(s) to one or more separate signal generator(s);

generating a different frequency signal for each one of said multiple data files/streams/segments, said first and/or first and additional file(s)/stream(s)/segment(s), wherein said multiple digital data files/streams/segments, said first and/or said first and additional digital data file(s)/stream(s)/segment(s) are separated from one another by a specified frequency bandwidth;

combining said multiple digital data files/streams/segments, said first and/or said first and additional digital file(s)/stream(s)/segment(s) into one or more multi-frequency signals(s); and transmitting said one or more multi-frequency signals(s) over one or more communication line(s)/medium(s)/network(s) in a timed and marked relationship to one another.

3. A method according to claim 1 or 2, wherein said first and/or said first and additional digital data file(s)/stream(s)/segment(s) is transmitted separately from but in a timed and marked relationship to said multi-frequency signal(s) containing said multiple digital data files/streams/segments.

4. The method according to claim 1, 2 or 3, wherein said multi-frequency signal(s) is/are segmented, said multi-frequency signal(s) segments being transmitted separately but in a timed and marked/encrypted relationship to one another over at least one communication line/medium/network.

5. The method according to claim 1, wherein said multiple data files/streams/segments are created from bytes of data to be transmitted, each of said bytes of data to be transmitted being comprised of bits of data, each of said bits corresponding to a particular position within said bytes of data to be transmitted, and each one of said data files/streams/segments being comprised of bits from said bytes corresponding to a particular positional alignment relative to one another which alignment is predetermined.

6. The method according to claim 1, 2, 3, 4 or 5, wherein said positional alignment of said bits of data from said bytes of data to be transmitted is marked by means of a separate clocking/encryption signal which may be added to and sent along with or separately from said combined multi-frequency signal containing said multiple digital data files/streams/segments.

7. The method according to claim 1, 2, 3, 4, 5 or 6, wherein said multiple data files/streams/segments are created from bytes of data to be transmitted, wherein each one of said multiple data files/streams/segments is comprised of, a separate, at least one of said bytes of data to be transmitted.

8. The method according to claim 1, 2, 3, 4, 5, 6, or 7, wherein a timed start/stop and/or sequence/encryption command is added to at least one of said multiple digital data files/streams/segments.

9. The method according to claim 1, 2, 3, 4, 5, 6 or 7, wherein said timed start/stop and/or sequence/encryption command is/are created as one or more separate data file(s)/stream(s)/segment(s) which may be transmitted along with or separately from, but in a timed and marked relationship to, said one or more multi-frequency signal(s) containing said multiple digital data files/streams/segments.

10. The method according to claim 1 or 2, wherein each one of said data files/streams/segments comprising said multi-frequency signal to be transmitted simultaneously or in a timed relationship, is comprised of a plurality of bits of data, each one of said bits corresponding to a particular sequential patterned and/or marked and/or encrypted positional relationship within said data files/streams/segments, and each bit of data within said data files/streams/segments corresponding to and being positionally located within said data files/streams/segments in a like sequential patterned and marked and/or encrypted positional relationship.

11. The method according to claim 10, wherein said sequential patterned and/or marked and/or encrypted positional relationship is designated by a separate, at least one, clocking/encryption signal which may be transmitted along with, or separately from, said one or more multi-frequency signal(s) containing said data files/streams/segments to be transmitted.

12. The method according to claim 1 or 2, wherein said multiple data files/streams/segments are transmitted in a timed and marked positional relationship to one another over one or more separate or multi-frequency transmission signal(s) but not simultaneously.

13. The method according to claim 1 or 2, wherein said multiple bits of data within said multiple data files/streams/segments corresponding to a first position in each one of said files/streams/segments are transmitted first, and the bits of data corresponding to a last position in each one of said data files/streams/segments are transmitted last.

14. The method according to claim 1 or 2, wherein the relative positional alignment of said bits of data within said multiple data files/streams/segments to be transmitted is defined and noted by a separate, at least one, data file/stream/segment which may or may not be transmitted simultaneously with or separately from said multiple data files/streams/segments.

15. The method according to claim 1 or 2, wherein said method is used to transmit data via a facsimile machine, computer, computer network, video telephone, audio, video and/or audio/video and/or data network.

16. The method according to claim 1–14, wherein said data to be transmitted is compressed and/or encrypted before transmission.

17. The method according to claim 1, wherein said compression of said data to be transmitted is achieved by segmenting said bytes of data into bits and placing each of said bits sequentially in a mapped, wrapped, stacked or patterned relationship to one another within said multiple data files/streams/segments to be transmitted simultaneously or in a timed relationship over said multi-frequency signal(s).

18. The method according to claim 1, wherein said compression of said data to be transmitted is achieved by segmenting said data to be transmitted into bytes and placing said bytes of said data to be transmitted in a mapped, wrapped, stacked or patterned relationship to one another within said data files/streams/segments to be transmitted simultaneously or in a timed relationship over said multi-frequency signal(s).

19. The method according to claim 1, wherein said compression is accomplished by placing said bits of said bytes or said bytes of data to be transmitted in a predetermined non-sequential pattern within said data files/streams/segments with said predetermined non-sequential pattern being noted in at least one separate data mapping/encryption file(s)/stream(s)/segment(s) which may be sent along with or separately from said data files/streams/segments to be transmitted.

20. The method according to claim 18, wherein said at least one separate data mapping/encryption file(s)/stream(s)/segment(s) corresponds to one or more key code(s) which are resident in both the sending and receiving units, said resident key code(s) being used to encrypt and decrypt said multiple data files/streams/segments.

21. The method according to claim 1–19, wherein said method is used to transmit data comprising an audio, video, combined audio and video and/or any like digital data signal over a communication line/medium/network.

22. The method according to claim 1–20, wherein said method is used as a security/encryption method.

23. The method according to claim 1–20, wherein said method is used as a method of data compression.

24. The method according to claim 1 or 2, wherein said multiple transmission frequencies comprising said multi-frequency signal containing said multiple data files/streams/segments are frequencies contained within the electromagnetic and/or optical frequency spectra.

25. The method according to claim 1 or 2, wherein said multiple data files/streams/segments are created from bytes of data to be transmitted, each one of said bytes being comprised of eight bits of data, each one of said bits corresponding to a particular position within each one of said bytes, and each one of said data files/streams/segments being comprised of bits from one or more of said bytes corresponding to the same particular position.

26. The method according to claim 24, wherein said particular position of said data within said multiple data files/streams/segments is defined and recorded within a separate clocking/encryption signal which may be sent along with or separately from said multiple data files/streams/segments.

27. The method according to claim 1 or 2, wherein said multiple data files/streams/segments are created from bytes of data to be transmitted, wherein each on of said multiple data files/streams/segments is comprised of at least one bit of data from said bytes.

28. The method according to claim 1–27, wherein said multiple data files/streams/segments are created from bytes of said data to be transmitted, wherein each of said multiple data files/streams/segments is comprised of one or more of said bytes of said data to be transmitted, wherein said bytes of data are positioned within said multiple data files/streams/segments in predetermined positions corresponding to their original positions within said data to be transmitted.

29. The method according to claim 1 or 2, wherein said multiple data files/streams/segments are processed looped configuration i.e. data input, cpu, memory, cpu, memory, data transmit.

30. The method according to claim 1 or 2, wherein said multi-frequency transmission signal containing said multiple data files/streams/segments to be transmitted is segmented and transmitted sequentially or in a defined and recorded pattern as multi-frequency data transmission segments of said data files/streams/segments to be transmitted.

31. The method according to claim 30 wherein said multi-frequency data transmission segments are transmitted in a predetermined pattern over time, wherein said predetermined pattern is noted and recorded within at least one separate clocking/encryption data file(s)/stream(s)/segment(s), wherein said at least one separate clocking/encryption data file(s)/stream(s)/segment(s) may be transmitted along with or separately from said multi-frequency data transmission segments, or which clocking/encryption data file(s)/stream(s)/segment(s) may transmitted as a code key which refers to a predetermined clocking/encryption-decryption file which is resident within both the sending and the receiving units and wherein said clocking/encryption-decryption file is accessed by said receiving unit by referring to said code key for the purpose of decrypting said data file(s)/stream(s)/segment(s) received from said sending unit.

* * * * *